(12) United States Patent
Dooley

(10) Patent No.: US 8,975,877 B2
(45) Date of Patent: Mar. 10, 2015

(54) DC MOTOR ASSEMBLY WITH SOFT STARTING CAPABILITY

(75) Inventor: Kevin Allan Dooley, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 837 days.

(21) Appl. No.: 12/953,863

(22) Filed: Nov. 24, 2010

(65) Prior Publication Data
US 2012/0126547 A1  May 24, 2012

(51) Int. Cl.
*H02P 9/00* (2006.01)

(52) U.S. Cl.
USPC ............................ 322/44; 332/24

(58) Field of Classification Search
USPC ............... 322/24, 44, 28; 290/38 R, 40 R
See application file for complete search history.

(56) References Cited

U.S. PATENT DOCUMENTS

| | | | |
|---|---|---|---|
| 3,214,599 A * | 10/1965 | Wellford | 307/84 |
| 3,573,580 A | 4/1971 | Shinozaki | |
| 3,696,277 A * | 10/1972 | Liska et al. | 318/400.11 |
| 3,742,370 A | 6/1973 | Hansen | |
| 3,753,077 A * | 8/1973 | Anderson et al. | 363/124 |
| 3,783,357 A * | 1/1974 | Ichiyanage | 318/400.09 |
| RE29,275 E * | 6/1977 | Berman et al. | 318/798 |
| 4,219,739 A * | 8/1980 | Greenwell | 290/46 |
| 4,359,674 A * | 11/1982 | Gotou | 318/400.07 |
| 4,489,264 A | 12/1984 | Dabney | |
| 4,492,903 A * | 1/1985 | Knight et al. | 318/400.15 |
| 4,628,241 A | 12/1986 | Bristow et al. | |
| 4,700,116 A * | 10/1987 | Inoue et al. | 318/400.11 |
| 5,008,608 A | 4/1991 | Unsworth et al. | |
| 5,065,305 A | 11/1991 | Rich | |
| 5,254,936 A * | 10/1993 | Leaf et al. | 322/90 |
| 5,448,154 A * | 9/1995 | Kanke et al. | 322/28 |
| 5,627,738 A | 5/1997 | Lubomirsky et al. | |
| 5,796,226 A * | 8/1998 | Ookawa et al. | 318/400.23 |
| 5,859,514 A | 1/1999 | Chouffier et al. | |
| 5,883,486 A | 3/1999 | Earhart, Jr. et al. | |
| 6,208,111 B1 | 3/2001 | Williams | |
| 6,563,287 B2 | 5/2003 | Shepeck et al. | |
| 6,781,342 B2 | 8/2004 | Tolbert, Jr. et al. | |
| 7,282,887 B1 | 10/2007 | Williams | |
| 2005/0162140 A1 | 7/2005 | Hirst | |
| 2008/0074072 A1* | 3/2008 | Yoshihisa | 318/696 |

OTHER PUBLICATIONS

Motor Soft Starter; China Suppliers—Suppliers, Manufacturers, Exporters & Importers; Soruce: http://detail.en.china.cn/provide/detail,1064009270.html.
Soft start equipment with common current source inverter for several high voltage motors; Fuchs et al; Garbe, Lahmeyer & Co. AG, Federal Republic of Germany; Source: http://ieeexplore.ieee.org/stamp/stamp.jsp?arnumber=00055417.

* cited by examiner

*Primary Examiner* — Julio C. Gonzalez
(74) *Attorney, Agent, or Firm* — Norton Rose Fulbright Canada LLP

(57) ABSTRACT

A DC motor assembly (10) with soft starting capability is provided. The assembly (10) comprises a DC motor (12) including an armature (14) and a field winding (16) adapted to be excited separately from the armature; and circuitry configured to controllably increase current flow through the field winding of the DC motor as a function of time during starting of the DC motor.

13 Claims, 1 Drawing Sheet

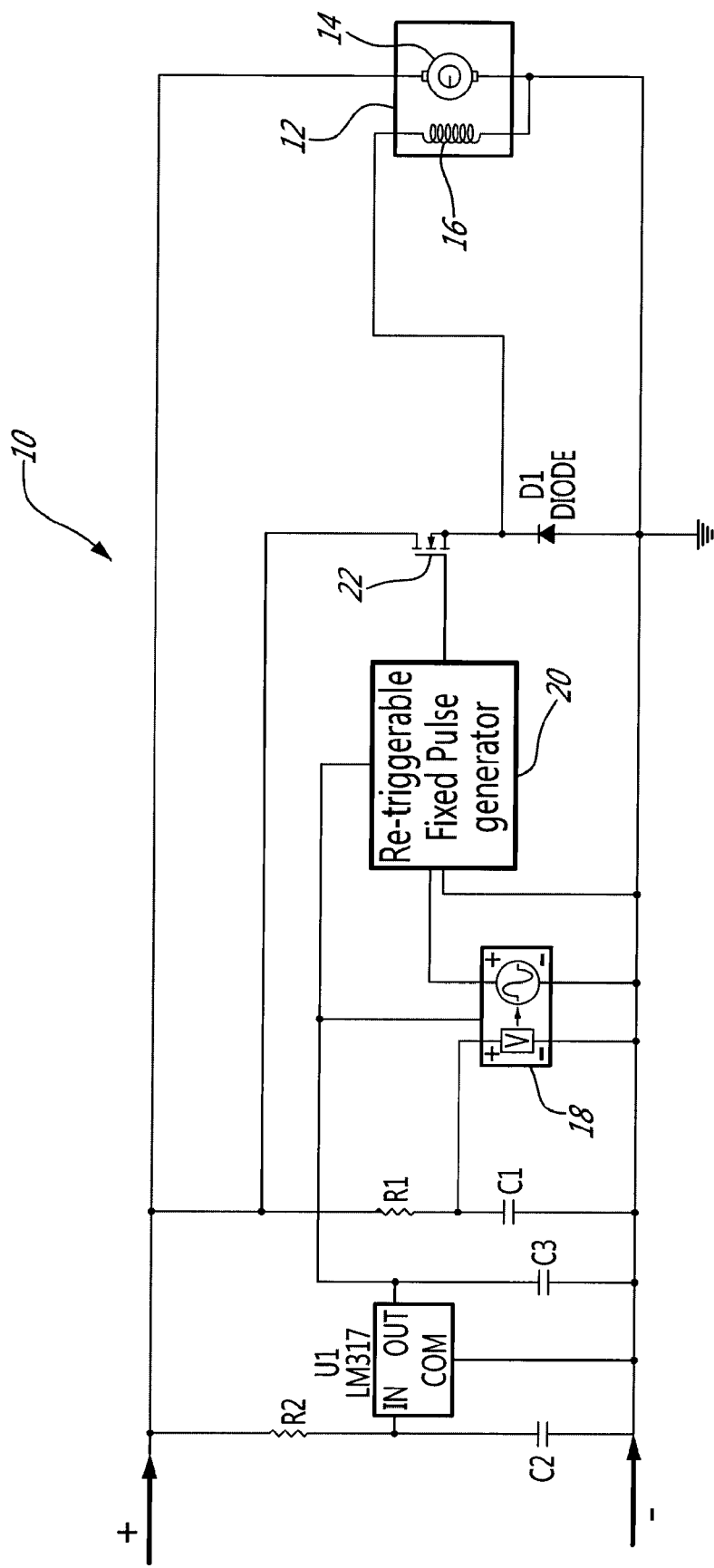

DC MOTOR ASSEMBLY WITH SOFT STARTING CAPABILITY

TECHNICAL FIELD

The disclosure relates generally to starting of DC motors, and more particularly to soft starting of DC motors.

BACKGROUND OF THE ART

DC motors may be provided with means to prevent or diminish an initial torque spike caused by an inrush current associated with starting, in order to avoid damage to the DC motors or to any mechanical load coupled to the DC motors. Various solutions for such "soft starting" of DC motors are known. For example, one solution includes limiting the inrush current to the armature of a DC motor by connecting a variable resistance in series with the armature. Another solution includes disconnecting any mechanical load from the output shaft of the DC motor during starting and later reconnecting the load. For aircraft applications, these solutions may be cumbersome, heavy and therefore undesirable. For example, a DC motor serving as a starter motor for a gas turbine engine may experience an inrush current of around 1200 to 1500 amperes. Equipment required to limit inrush current of such magnitude may be heavy and not sufficiently reliable for an aircraft application. Similarly, decoupling of a mechanical load from the output shaft during starting may require the use of a clutch that may be heavy and prone to wear and failure.

Improvement in starting of DC motors is therefore desirable.

SUMMARY

The disclosure describes electric machines, and in particular improved systems, devices, and processes for starting DC motors.

In various aspects, for example, the disclosure describes DC motor assemblies with soft starting capability and methods for soft starting DC motors.

Thus, in one aspect, the disclosure provides a DC motor assembly which may comprise: a DC motor including an armature and a field winding adapted to be excited separately from the armature; and circuitry configured to controllably increase current flow through the field winding of the DC motor as a function of time during starting of the DC motor.

In a another aspect, the disclosure provides a DC motor assembly for starting a gas turbine engine, the DC motor assembly having the ability to gradually increase an output torque as a function of time during starting. The assembly may comprise: a DC motor including an armature and a field winding adapted to be excited separately from the armature; and means for controllably increasing current flow through the field winding of the DC motor as a function of time during starting of the DC motor.

In a further aspect, the disclosure provides a method for soft starting a DC motor wherein the DC motor may include an armature and a field winding adapted to be excited separately from the armature. The method may comprise controllably increasing current flow through the field winding of the DC motor as a function of time during starting of the DC motor.

Further details of these and other aspects of the subject matter of this application will be apparent from the detailed description and drawings included below.

DESCRIPTION OF THE DRAWINGS

Reference is now made to the accompanying drawing.

FIG. 1 is a schematic illustration of an embodiment of a DC motor assembly with soft starting capability in accordance with the disclosure.

DETAILED DESCRIPTION OF THE PREFERRED EMBODIMENTS

Various aspects of preferred embodiments are described through reference to the drawing.

FIG. 1 illustrates a direct-current (DC) motor assembly, generally shown at 10. In the embodiment shown, DC motor assembly 10 comprises DC motor 12 and circuitry configured to provide a soft starting capability to DC motor 12. DC motor 12 may be a conventional brushed DC motor and may, for example, be of a type suitable for use in starting a gas turbine engine (not shown) for an aircraft application. DC motor 12 may also be configured to operate as a generator. Like conventional DC motors wherein separate power is provided to both the armature and fields, DC motor 12 may comprise an armature 14 and field winding(s) 16. Armature 14 may comprise one or more coils disposed on a rotor of DC motor 12 and be configured to receive main line current to induce an electro-magnetic force relative to a stationary magnetic field. Field winding(s) 16 may comprise one or more coils disposed on pole pieces and be configured to receive current to generate the stationary magnetic field. Field winding(s) 16 may be excited separately from the armature 14 using the same or a different independent power source. Armature 14 and field winding(s) 16 of DC motor 12 may be parallel wound as shown in FIG. 1.

DC motor assembly 10 may comprise circuitry configured to controllably increase current flow through field winding(s) 16 during starting of the DC motor 12. Such controlled increase of current flow through field winding(s) 16 may be implemented as a function of time. The controlled increase of current flow in field winding may be done as a function of time, for example, to provide a soft starting capability and thereby prevent a potentially damaging torque spike when starting DC motor 12.

Circuitry of DC motor assembly 10 may comprise one or more voltage control oscillators (VOC(s)) 18 configured to provide VOC output to one or more re-triggerable fixed pulse generators 20. Pulses generated by pulse generator(s) 20 may be used to operate switching device(s) 22. Switching device(s) 22 may be operable to control a flow of current through field winding(s) 16. As will be understood by those skilled in the relevant arts, depending on the specific application the magnitude of the current flowing in field winding(s) 16 may be sufficiently low that switching device(s) 22 may comprise one or more metal oxide semiconductor field effect transistor(s) (MOSFET(s)). VOC(s) 18 may be configured to deliver any type of waveform including sinusoidal, for example, suitable for pulse generator 20.

As will be understood by those skilled in the relevant arts, VOC(s) 18, pulse generator(s) 20, and MOSFET(s) used in implementing the disclosed systems may be of any type suitable for accomplishing the purposes disclosed herein, including several types currently commercially available. For example, time constant(s) and input control voltage of VOC(s) 18 may be selected based on the values of resistor(s) R1 and of capacitor(s) C1.

In the embodiment shown, the circuitry of assembly 10 further comprises a voltage regulator U1 ("LM317"). As those skilled in the relevant arts will understand, one or more such voltage regulators may be provided, for example, to provide regulated voltage for powering microchips or other controllers associated with VOC(s) 18 and/or pulse generator(s) 20.

As noted above, DC motors are sometimes provided with means to prevent or diminish the initial torque spike associated with starting to avoid damage to the DC motors or any mechanical load coupled to the DC motors. Various solutions for soft starting DC motors that have been used in the past include limiting the inrush current to the armature of a DC motor and/or disconnecting any mechanical load from the output shaft of the DC motor during starting. For aircraft applications, these solutions may be cumbersome, heavy and therefore undesirable. Other techniques have been used where field current may be adjusted to alter the torque and speed relationship based on rotor speed where the field current is a function of the measured speed of the rotor. Instead of attempting to limit the inrush current to armature 14 or using mechanical torque-limiting devices to protect mechanical loads connected to a DC motor, circuitry of DC motor assembly(ies) 10 in accordance with the disclosure may be configured to produce a controlled increase of current flow through field winding(s) 16 as a function of time. Also, since the controlled increase of current flow through field winding(s) 16 may be done as a function of time, measurement of rotor speed may not be required for the purpose of providing soft-start capability.

The controlled increase in current flow as a function of time may prevent current in field winding(s) 16 from rising quickly during starting and consequently may prevent a damaging torque spike from being produced. The current in field winding(s) 16 may be permitted to increase from zero to a nominal operating value over a suitable period of time instead of instantaneously when power is applied to DC motor assembly 10. The controlled increase in current flow through field winding(s) 16 may permit a rotor of DC motor 12 to gain rotational speed and take up (i.e. eliminate) any backlash in DC motor 12 and/or any system or accessory driven by DC motor 12 before current may be permitted to flow in field winding(s) 16 at its nominal operating magnitude. Accordingly, the gradual increase of current flow through winding(s) 16 may prevent larger than usual transient torques from being transmitted to driven system(s) or accessory(ies) as backlash is eliminated. For example, relatively large torque transients may be transmitted to driven system(s) or accessory(ies) if a rotor or a motor accelerates to a relatively high angular velocity before any backlash has been eliminated.

The magnitude of current flowing through a field winding of a DC motor is typically only a small fraction of the magnitude of the main current through the armature. Accordingly, equipment required to control current flow through field winding(s) 16 may be more suitable for aircraft applications. For example, a conventional MOSFET may be used as switching device 22 to control the flow of current through field winding(s) 16.

During operation, when power is first applied to a DC motor assembly 10, a high inrush current may be permitted to flow to armature 14. Since no current initially flows through field winding(s) 16, no problematic torque spike is initially produced by motor 12 regardless of the magnitude of the main current flowing through armature 14. When power is first applied to DC motor assembly 10, capacitor(s) C1, which is(are) connected in parallel with VOC 18(s), begins to charge. While capacitor(s) C1 is(are) charging, the input voltage to VOC(s) 18 may gradually increase from zero to a nominal operating voltage and consequently may cause the frequency of the output signal from VOC(s) 18 to increase from zero to, for example, a selected or design frequency. As will be understood by those skilled in the relevant arts, the period of time during which input voltage to VOC 18(s) rises from zero to the nominal operating voltage may be chosen through proper selection of capacitor C1 and resistor R1 considering, for example, the size of the motor and torques expected to be developed therein during start-up processes.

Output from VOC(s) 18 may cause pulse generator(s) 20 to repeatedly output pulses to trigger switching device(s) 22 to repeatedly close and allow current to flow (i.e. increase from a zero value) through field winding(s) 16 and then re-open to prevent current from flowing (i.e. from further increasing) through field winding(s) 16. Pulses generated by pulse generator(s) 20 may be of fixed duration. Current initially injected into field winding(s) 16 while switching device(s) is(are) closed (i.e. ON state) will commutate and decrease in magnitude through diode D1 while switching device(s) 22 is(are) open (i.e. OFF state). Accordingly, this may result in an average current that is proportional to the closed (ON) relative the open (OFF) time of switching device(s) 22. The duration of the pulses generated by pulse generator(s) 20 may be selected to be slightly greater than the period of the output signal(s) of VOC(s) 18 when operating at the design frequency. Therefore, once the frequency of the output signal of VOC(s) 18 has reached the design frequency, the output of pulse generator(s) 20 may be continuous (i.e. DC) signal(s) causing switching device(s) 22 to remain closed and allow current to flow through field winding(s) 16 and reach a nominal operating value.

Periodic or other repetitive closing and opening of switching device(s) 22 may be used to control the duty cycle(s) of current flowing through field winding(s) 16. Increasing of frequency(ies) of the output from VOC(s) 18 from zero to the design frequency(ies) during starting of motor 12 may cause the duty cycle(s) of current(s) in field winding(s) 16 (i.e. average current(s)) to increase from 0 to 100% over a selected or otherwise predetermined period of time. Such gradual increase(s) of average current flowing through field winding(s) 16 may correspondingly result in a gradual increase in output torque by motor 12 even if a high inrush current initially flows through armature 14.

The period of time over which the duty cycle increases from 0% to 100% may be selected or determined based on a sensed environmental condition such as temperature for example. For example, in a case where motor 12 is used to start a gas turbine (not shown), it may be more difficult to turn over the engine in very cold weather as opposed to tropical weather and a suitable period of time may be selected accordingly. A relevant environmental condition may be sensed and a suitable period of time may be automatically selected based on the sensed condition.

It is possible to control time periods in which the duty cycle is varied from start to 100% by, for example, controlling any or all of R1, C1, and/or the input voltage as a function of time. For example, as those skilled in the relevant arts will understand, R1 may be implemented using one or more suitably-selected thermistors.

For some applications, a period of time of around one to three seconds may be suitable.

The exemplary DC motor assembly 10, and its method of operation, are related to controllably increasing the duty cycle of current flowing through field winding(s) 16 by increasing the frequency of pulses of fixed duration during starting of motor 12. However, those skilled in the relevant arts will understand that other methods of controllably increasing current flow through field winding(s) 16 may be used. For example, circuitry configured for pulse width modulation (PWM) could instead be used to increase the duty cycle of current continuously flowing through field winding(s) 16 by gradually increasing the duration of the pulses controlling switching device(s) 22. Alternatively, the magnitude of the current flowing through field winding(s) 16 could be increased as a function of time. For example, a variable resistor (not shown) could be connected in series with field winding(s) 16 and have its resistance decreased over a period of time. Also, the current flow in field winding(s) 16 could be increased in a linear or non-linear manner as a function of time depending on the specific condition. Various current profiles (i.e. shapes) as a function of time could be used depending on the specific application.

The above description is meant to be exemplary only, and those skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. A DC motor assembly with soft starting capability, the assembly comprising:
    a DC motor including an armature and a field winding adapted to be excited separately from the armature; and
    circuitry configured to controllably increase current flow through the field winding of the DC motor as a function of time over a predetermined period of time selected to conduct soft-starting of the DC motor, the circuitry comprising a switching device configured to control the flow of current through the field winding, the switching device being controlled by a generator of pulses of a fixed duration and wherein the circuitry is configured to control a frequency of the pulses to control an average current through the field winding.

2. The assembly as defined in claim 1, wherein the circuitry is configured to control a duty cycle of current through the field winding.

3. The assembly as defined in claims 1, wherein the circuitry comprises a voltage controlled oscillator to control the frequency of the pulses.

4. A DC motor assembly for starting a gas turbine engine, the DC motor assembly having the ability to gradually increase an output torque as a function of time during starting, the assembly comprising:
    a DC motor including an armature and a field winding adapted to be excited separately from the armature; and
    means for controllably increasing current flow through the field winding of the DC motor as a function of time over a predetermined period of time selected to conduct soft-starting of the DC motor where the period of time is selected independently of a speed of a rotor of the motor.

5. The assembly as defined in claim 4, comprising means for increasing an average current through the field winding over the period of time.

6. The assembly as defined in claim 4, comprising means for increasing a duty cycle of current through the field winding.

7. The assembly as defined in claim 6, comprising means for controlling a frequency of pulses of fixed duration during which current is permitted through the field winding.

8. A method for soft starting a DC motor wherein the DC motor includes an armature and a field winding adapted to be excited separately from the armature, the method comprising:
    controllably increasing current flow through the field winding of the DC motor as a function of time over a predetermined period of time selected to conduct soft-starting of the DC motor;
    repeatedly permitting current to flow in the field winding for a fixed duration and then preventing current from flowing in the field winding; and
    increasing the frequency at which current is repeatedly permitted to flow and prevented from flowing in the field winding wherein the frequency is increased as a function of time until current is continuously permitted to flow in the field winding.

9. The method as defined in claim 8, comprising gradually increasing an average current through the field winding.

10. The method as defined in claim 8, comprising increasing a duty cycle of current flowing through the field winding.

11. The method as defined in claim 8, comprising determining the period of time over which to increase the frequency based at least partly on an environmental condition.

12. The method as defined in claim 11, wherein the environmental condition is a temperature.

13. The method as defined in claim 8, comprising determining the period of time over which to increase current flow based at least partly on an environmental condition.

\* \* \* \* \*